COLOR TELEVISION PICKUP APPARATUS

Filed May 7, 1965

2 Sheets-Sheet 1

Inventor:
Richard von Felgel-Farnholz
Friedrich Michels
by Michael S. Striker
Attorney Inventor:
Richard von Felgel-Farnholz
Friedrich Michels
by Michael S. Striker
Attorney United States Patent Office 3,349,170
Patented Oct. 24, 1967

3,349,170
COLOR TELEVISION PICKUP APPARATUS

Richard von Felgel-Farnholz, Darmstadt-Eberstadt, and Friedrich Michels, Darmstadt, Germany, assignors to Fernseh G.m.b.H., Darmstadt, Germany Filed May 7, 1965, Ser. No. 453,931
Claims priority, application Germany, May 29, 1964, F 43,013
19 Claims. (Cl. 178—5.4)

ABSTRACT OF THE DISCLOSURE

An arrangement for increasing the sensitivity of color television pick-up apparatus such as color television cameras. The photo-sensitive coating on a glass plate in, for example, the photo-cathode of a television pick-up tube, is provided with an intermediate layer. This intermediate layer serves to increase the amount of light transmitted to the photo-sensitive coating and to diminish the amount of light reflected therefrom, thereby increasing the intensity of the signal imparted to the photo-cathode. Provided that the intermediate layer is of appropriate thickness and has the proper refractive index, also complete suppression of reflection and practically complete transmission of the incident light into the photo-sensitive layer is realized. As a result of the greater proportion of light transmitted to the photo-cathode, improved signal conditions are obtained, thereby increasing the sensitivity of the apparatus.

Figures 1, 2, 3:
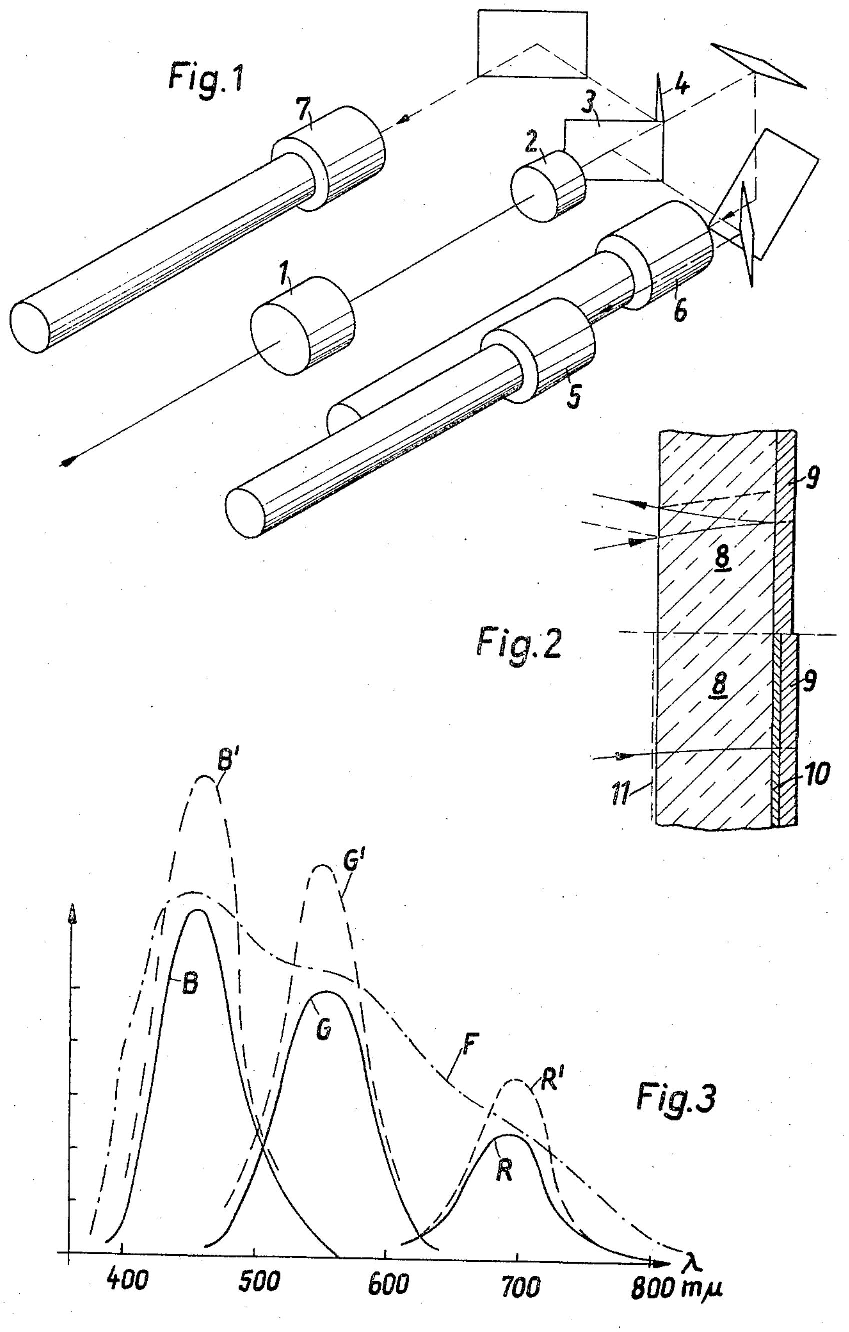

The invention relates to color television pickup apparatus such as color television cameras or color television film-scanning apparatus, and provides apparatus of increased sensitivity as compared with known apparatus of like nature.

The basic principle of present-day color television pickup apparatus is that light entering through the objective lens is divided among two or more optical paths by means of mirrors and filters, specifically by means of dichroic mirrors, and is applied to as many light-sensitive devices, such as television pickup tubes or photocells. If the number of optical paths (usually either 2, 3 or 4) is equal to $n$ and A is the attenuation factor to which the light is subjected in each path, then the fraction of the originally incident light which is incident on each pickup tube is equal to $$\frac{1}{n}A$$

Thus if there are three color channels and the attenuation factor A of all the channels is the same, being for example 0·5, then the amount of light incident on each of the camera tubes is reduced to one-sixth of the original amount of light. In general it will be difficult to obtain an attenuation factor of 0·5, since on the one hand the objective lens used usually has a smaller aperture than is usual for monochrome cameras, owing to the restricted size of the available beam-splitting devices, and on the other hand only a relative narrow spectral range is usefully employed by each camera tube. The result of this is that very much less favorable conditions of illumination are present in color television pickup apparatus than in corresponding apparatus used in black-and-white television systems.

The present invention arises from the requirement that the transmission of light to the photocathode of the television camera tube be improved so that the sensitivity of each individual channel may be substantially increased.

In a known method of avoiding reflection losses in photocells there is disposed between the photosensitive coating at least one layer of transparent material of such thickness and of such refractive index that losses due to reflection at the photosensitive coating are practically avoided and an increase in sensitivity is produced by interference in the intermediate layer. In general, the refractive index of the intermediate layer has a value which is the geometric mean between the refractive index of the glass envelope and that of the photosensitive coating, while the thickness of the intermediate layer is equal to a quarter-wavelength of light or to an odd multiple of this. The thickness of the layer is usually adjusted in relation to the wavelength at which the maximum sensitivity of the photosensitive coating occurs, since in practice effective gain is obtained only in this case. This is attributable to the fact that a reduction in sensitivity occurs for those wavelengths at which the intermediate layer does no have a thickness equal to a multiple of one quarter of a wavelength.

In color television pickup apparatus according to the present invention incident light is divided into a plurality of components, each of which is transmitted through a transparent support and a transparent intermediate layer to an individual photosensitive coating, said intermediate layer having a refractive index intermediate between those of said support and of said coating and said intermediate layers having individual thicknesses such that the photoelectric response of each said coating is substantially increased within an individual wavelength range as compared with its response in the absence of said intermediate layer.

It is in practice advantageously arranged that there is initially provided on the glass support for the photosensitive coating a transparent layer with a refractive index which is the geometric mean between those of the support and of the photosensitive coating and having a thickness which is chosen to be an odd multiple, preferably by the factor unity, of one quarter of a wavelength of light in the middle of the spectral range to which the photo-sensitive coating is required to respond. After this operation the photosensitive coating itself is deposited. By this means it is arranged that the losses due to reflection at the photosensitive coating at the stated wavelength are practically negligible, so that a substantial increase in sensitivity is obtained within the required range. Photocathodes formerly used, in particular those of the antimony—caesium or bismuth—caesium type, possess a refractive index which is relatively high as compared with that of the glass support, thus giving rise to considerable losses by reflection, which may be avoided by the use of the present invention.

The shape of the overall sensitivity curve is determined by the form of the intrinsic photosensitivity characteristic of the photosensitive coating. When it is required that the spectral response, that is, the maximum sensitivity, is to lie on the falling part of the intrinsic photosensitivity characteristic, then the maximum of the resultant characteristic may be displaced somewhat in the direction of the maximum of the intrinsic sensitivity characteristic. If it is required that the position of the maximum shall be symmetrical within the pass band, then it is advantageous to displace the selected wavelength somewhat in the direction of that part of the pass range nearer the maximum sensitivity of the photosensitive coating itself.

It may occur during the manufacture of television pickup tubes that the material for the intermediate layer, of which there are not a large number available, is incompatible with the material of the photocathode and is attacked by the caesium usually employed. In such a case it is advantageous to introduce between the photosensitive coating and the intermediate layer a barrier layer of neutral material such as glass, having a thickness small in comparison with a quarter wavelength. If sufficiently thin, such a barrier layer has little influence on the reflection.

The particular advantage of pickup apparatus of this kind is that there occurs in each channel a selective increase of the sensitivity in the spectral range to be transmitted, with a simultaneous reduction of sensitivity to colors not required to be transmitted by that channel. It is fortunate that in each case the spectral range for which an increase in sensitivity occurs substantially coincides with the pass-band of the color filter recommended for color television. This pass-band amounts to some 100 m$\mu$. The reduction in sensitivity at all wavelengths for which the thickness of the layer is not approximately equal to a quarter-wavelength, which is disadvantageous in black and white television, thus has an advantageous effect in improving the color purity in the individual channels. It is thus possible, because of the selectivity of the intermediate layers, to employ normal semi-transparent mirrors in place of dichroic mirrors in the beam splitter.

Figure 4:
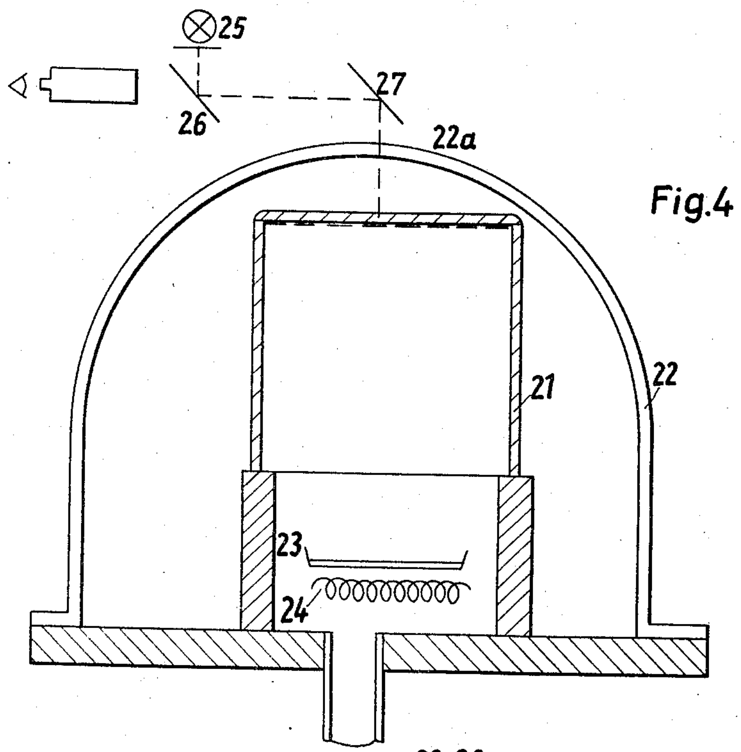
Figure 5:
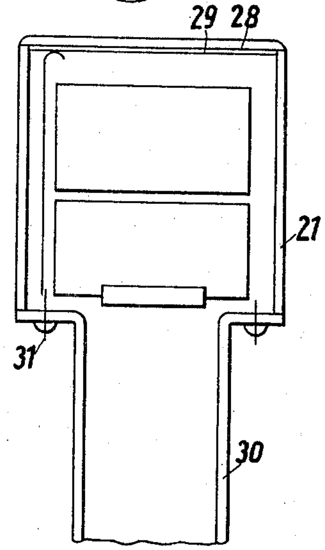

The invention will now be more particularly described with reference to the accompanying drawings, comprising FIGURES 1 to 5, of which:

FIGURE 1 shows a perspective diagram of the optical system of a color television pickup apparatus in which the present invention may be used, FIGURE 2 is a cross-section through part of a photosensitive device used in color television apparatus, showing both a known construction and the construction according to the invention, FIGURE 3 shows graphs representing the sensitivities of pickup tubes used in color television pickup apparatus according to the invention, FIGURE 4 shows apparatus suitable for the production of intermediate layers for image-orthicon pickup tubes for use in apparatus according to the invention, and FIGURE 5 is a schematic partial section through an image-orthicon pickup tube as used in carrying out the invention.

The optical system illustrated by FIGURE 1 consists essentially of an objective lens 1, a relay lens 2, two dichroic mirrors 3, 4, a number of undesignated path-folding mirrors and three pickup tubes 5, 6 and 7. Since in general the color separation effected by the dichroic filters does not correspond exactly with the theoretical requirements, further correcting filters (not shown) will usually be included in the individual optical paths. It will be appreciated that the loss of light in the various optical elements must be considerable, so that intense illumination of the object is necessary in order to obtain sufficiently unambiguous signals at the outputs of the pickup tubes.

By the use of the present invention the sensitivity of each individual pickup is now increased exactly within that spectral range in which it is required to respond, and there is thus produced an increase in the overall sensitivity and a reduction in the illumination required. The means for producing this effect will now be described with reference to FIGURE 2. In this figure there is shown a section through the photocathode of a television pickup tube, for example of an image-orthicon, in which for comparison the upper half is untreated and the lower half is treated in accordance with the invention.

The photosensitive coating 9 is carried by a glass plate 8, of which the lower half is shown as provided with an intermediate layer 10. The materials used in present-day photocathodes and photosensitive semiconductors have a relatively high refractive index, so that at the interface between the glass and the photo-sensitive material some 30% or more of the light is reflected. Provided that the photosensitive coating 9 is backed by an intermediate layer 10 of appropriate refractive index and suitable theoretically determined thickness, almost complete suppression of reflection and practically complete transmission of the incident light into the photo-sensitive layer is attained, so that an increase by a factor of one 1.5 of the effective photosensitivity results, at least within a definite wavelength range. In order further to increase the photosensitivity the outer surface of the envelope portion supporting the photosensitive coating may be provided with a blooming layer, as indicated by the broken line 11.

To produce the required effect of increased color sensitivity, the thickness of the intermediate layers, as well possibly as those of the blooming layers, are chosen to have a thickness of $\lambda/4$, where $\lambda$ is the wavelength of light in the center of the spectral transmission range of the appropriate color channel. If, for example, the GREEN color channel extends from $\lambda=506$ m$\mu$, to $\lambda=580$ m$\mu$, then the optical path length $\lambda/4$ should amount to $$\frac{1}{4}\cdot 550 \text{ m}\mu$$

The optical path length is calculated as the product of the refractive index $n_1$ of the intermediate layer and the thickness of this layer. If, for example, the refractive index of the photosensitive layer has a value of 3, and that of the glass support is 1.5, then the refractive index of the intermediate layer is chosen as the geometric mean of these two values, this value being obtained from the relation $\sqrt{3\times 1.5}=2.2$. In a more refined computation the complex value of the refractive index of the photosensitive layer resulting from its metallic conductivity may be taken into account. In the example mentioned the thickness of the intermediate layer, $d$, is found to be:

$$d=1/4(550\times 2.2)=301 \text{ m}\mu$$

For good matching of the pickup apparatus to the experimentally determined color distribution between the channels, for photosensitive layers of the same type in each pickup tube, it is found that the thickness of the intermediate layers in the blue-, green- and red-responsive tubes respectively should be in the ratios 14:17:19 for optimum results.

FIGURE 3 shows a number of graphs illustrating the advantages gained by the use of the present invention. All these graphs are plotted to a common wavelength scale as abscissa and to a common arbitrary response amplitude scale as ordinate. Curve F, given in chain line, shows the spectral response of the photosensitive material used in all the three pickup tubes alike. Curves B, G and R shown in solid line represent the spectral responses of the individual pickup tubes in the blue, green and red channels which result from the color separation filters, and curves B', G' and R' shown in broken line illustrate the improved channel response characteristics obtained by the use of the invention.

FIGURE 4 provides a schematic illustration of apparatus which may be used in the construction of a television pickup tube for use in carrying out the invention. In the drawing reference 21 denotes a glass cup such as is used to form that part of the envelope of a television pickup tube of the image-orthicon type which contains the photocathode and the image section. This cup 21 is placed within a glass bell 22 having a windown 22*a*. Opposite the bottom of cup 21 is disposed an evaporating boat 23 with a heater winding 24, in which there is placed evaporable material of appropriately high refractive index, such as cadmium sulphide, for example. The process of evaporation is monitored through the window 22*a*. For this purpose there is provided a source 25 of monochromatic light, preferably of the wavelength at which the increase in sensitivity is to be produced. By the aid of a semi-transparent mirror 26 and of a path-folding mirror 27 the reflection on the glass faceplate of the cup is observed during the process of evaporation. The reflection becomes a minimum when the optical path length in the evaporated layer is exactly equal to $\lambda/4$. In this case a maximum darkening of the reflected image occurs. Brightening due to reflections at the window 22*a* and at the external surface of the cup 21 may be suppressed in known manner by the use of blooming layers.

The relevant portion of the completed image-orthicon is shown by FIGURE 5. Here the cup 21, carrying the intermediate layer 28 on its inner surface, is sealed to the neck 30 at a flange 30*a* which carries the lead-in wires by which connection is made to electrodes within the cup 21. The thickness of the intermediate layer 28 is greatly enlarged for clarity in illustration. Upon intermediate layer 28 is deposited a photosensitive layer 29 which receives its operating potential by way of lead-in connection 31.

The invention is not limited to television pickup apparatus using pickup tubes with scanned electron beams, but is applicable also to apparatus using photocells with transparent photocathodes, such as are used in flying-spot scanners for producing color-television signals by the scanning of cinematographic films or slides.

What is claimed and desired to be secured by Letters Patent is:

1. Color television pickup apparatus comprising in combination: color splitter means dividing incident light into a plurality of color components having individual predetermined wavelength ranges; a like plurality of electrically light-sensitive devices, each said device including a transparent envelope portion having a predetermined first refractive index, an intermediate layer of predetermined optical thickness of a material having a predetermined second refractive index in direct contact with said envelope portion, and a photosensitive coating of a material having a predetermined third refractive index in direct contact with said intermediate layer; said second refractive index having a value intermediate between the values of said first and third refractive indices; said photosensitive coating being each disposed to receive an individual said color component by transmission through a related envelope portion and intermediate layer; and the optical thickness of each said intermediate layer being chosen such that the photoelectric efficiency of the photosensitive coatings within the predetermined wavelength range is increased and outside of this range decreased whereby the light energy of said incident light transmitted to said photosensitive coating is increased while the light energy of said incident light reflected from said pickup apparatus is decreased.

2. Color television apparatus as defined in claim 1 in which the value of said second refractive index is the geometric mean between the values of said first and third refractive indices.

3. Color television apparatus as defined in claim 1 in which a said light-sensitive device comprises additionally a barrier layer having a predetermined thickness and formed of a transparent material chemically inert to said photosensitive material disposed between said intermediate layer and said photosensitive coating, said thickness of said barrier layer being small compared with the thickness of said intermediate layer.

4. Color television pickup apparatus as defined in claim 1, in which each said light-sensitive device is a television pickup tube.

5. Color television pickup apparatus as defined in claim 1 in which each said light-sensitive device is a photoelectric cell.

6. Color television pickup apparatus as defined in claim 1 in which the thickness of a said intermediate layer is equal to one-quarter of a wavelength of light within the wavelength range of light transmitted therethrough.

7. Color television pickup apparatus as defined in claim 1 in which each said envelope portion is externally provided with a transparent anti-reflection layer.

8. Color television pickup apparatus as defined in claim 1 in which each said envelope portion is externally provided with an anti-reflection layer having a thickness which is an odd multiple of one-quarter of a wavelength of light comprised within the wavelength range of said color component.

9. Color television pickup apparatus comprising in combination: color splitter means dividing incident light into individual blue, green and red color components having predetermined wavelength ranges; lens means projecting light from an object by way of said color splitter means; respective electrically light-sensitive devices each disposed to receive an individual one of said color components projected by said lens means; each said device including a transparent envelope portion having a first refractive index, an intermediate layer of predetermined optical thickness of a material having a second refractive index in direct contact internally with said envelope portion, and a photosensitive coating of a material having a third refractive index in direct contact with said layer, said second refractive index having a value intermediate the values of said first and third refractive indices; said photosensitive coatings each being disposed to receive light in a said color component by transmission through the contacting intermediate layer; the optical thickness of each said intermediate layer being equal to an odd multiple of one quarter of the wavelength of light at a wavelength within the wavelength range of the color component transmitted therethrough and the ratios of the thicknesses of said intermediate layers transmitting said blue, green and red color components being as 14:17:19 whereby the light energy of said incident light transmitted to said photosensitive coating is increased while the light energy of said incident light reflected from said pickup apparatus is decreased.

10. Color television pickup apparatus as defined in claim 9 in which the value of said second refractive index is the geometric mean between the values of said first and third refractive indices.

11. Color television pickup apparatus as defined in claim 9 in which a said light-sensitive device comprises additionally interposed between said intermediate layer and said photosensitive coating a glass layer having a thickness small compared with that of said intermediate layer.

12. Color television pickup apparatus as defined in claim 9 in which each said light-sensitive device is a television pickup tube.

13. Color television pickup apparatus as defined in claim 9 in which each said light-sensitive device is a photoelectric cell.

14. Color television pickup apparatus as defined in claim 9 in which said multiple is unity multiple.

15. A color television pickup tube sensitive to light within a predetermined restricted wavelength range comprising a transparent envelope portion having a predetermined first refractive index; a layer having a predetermined thickness of a material having a second predetermined refractive index in direct contact with the interior of said envelope portion; and a photosensitive coating of a material having a third predetermined refractive index in direct contact with said intermediate layer; said second refractive index being equal to the geometric mean of said first and third refractive indices and the thickness of said intermediate layer being equal to an odd multiple of one quarter of a wavelength of light having a wavelength within said wavelength range.

16. A color television pickup tube as defined in claim 15 in which the thickness of said layer is equal to one quarter of a wavelength of light having a wavelength at the centre of said wavelength range.

17. The method of manufacturing a television pickup tube sensitive to light within a predetermined wavelength range which comprises the steps of:

providing an envelope portion including a transparent window having a first refractive index;

depositing on said window an intermediate layer of a predetermined optical thickness of a material having a second refractive index;

assembling said envelope portion as part of a complete envelope;

depositing upon said intermediate layer a coating of a photosensitive material having a third refractive index;

said second refractive index being intermediate between said first and second refractive indices and the optical thickness of said intermediate layer being equal to an odd multiple of one quarter of a wavelength of light having a wavelength within said predetermined range.

18. Color television pickup apparatus comprising in combination: beam splitter means dividing an optical image projected thereon into a plurality of individual component images; lens means projecting into said beam splitter an optical image of an object; a like plurality of electrically light-sensitive devices, each said device including a transparent envelope portion having a first refractive index, an intermediate layer of predetermined optical thickness of a material having a second refractive index in direct contact internally with said envelope portion, and a coating of photosensitive material having a third refractive index in direct contact with said intermediate layer; the value of said second refractive index being intermediate between the values of said first and third indices, and the optical thickness of each of said intermediate layer being individually equal to an odd multiple of one quarter of a wavelength of light at an individual wavelength centrally disposed within an exclusive wavelength range.

19. Color television apparatus as defined in claim 18 in which each said transparent envelope portion is externally provided with an anti-reflection layer having an optical thickness equal to an odd multiple of one quarter of a wavelength within said exclusive wavelength range.

References Cited

UNITED STATES PATENTS

| | | | |
|---|---|---|---|
| 2,376,428 | 5/1945 | Hansell | 350—164 |
| 2,871,371 | 1/1959 | Gray | 350—166 |
| 2,972,691 | 2/1961 | Kossel | 313—94 |
| 3,043,976 | 7/1962 | Kossel | 319—94 |
| 3,213,315 | 10/1965 | Lempert | 315—10 |
| 3,235,397 | 2/1966 | Millendorfer | 88—1 |

JOHN W. CALDWELL, *Acting Primary Examiner.*

DAVID G. REDINBAUGH, *Examiner.*

J. A. O'BRIEN, *Assistant Examiner.*